(12) United States Patent
Boydens et al.

(10) Patent No.: US 11,185,004 B2
(45) Date of Patent: Nov. 30, 2021

(54) VEHICLE-TRAILER COMBINATIONS

(71) Applicant: CNH Industrial America LLC, New Holland, PA (US)

(72) Inventors: Joachim Boydens, Zedelgem (BE); Thomas Debbaut, Ronsele (BE); Didier Verhaeghe, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/612,747

(22) PCT Filed: May 9, 2018

(86) PCT No.: PCT/EP2018/062081
§ 371 (c)(1),
(2) Date: Nov. 11, 2019

(87) PCT Pub. No.: WO2018/206683
PCT Pub. Date: Nov. 15, 2018

(65) Prior Publication Data
US 2020/0077564 A1    Mar. 12, 2020

(30) Foreign Application Priority Data
May 9, 2017    (BE) .................................. 2017/5338

(51) Int. Cl.
*A01B 69/08* (2006.01)
*A01B 69/00* (2006.01)

(52) U.S. Cl.
CPC .......... *A01B 69/006* (2013.01); *A01B 69/004* (2013.01)

(58) Field of Classification Search
CPC .............................. A01B 9/006; A01B 9/004
See application file for complete search history.

(56) References Cited

U.S. PATENT DOCUMENTS

| | | | |
|---|---|---|---|
| 4,555,725 A | 11/1985 | Geiersbach et al. | |
| 5,163,277 A * | 11/1992 | Fransgaard | A01D 78/12 |
| | | | 56/15.5 |

(Continued)

FOREIGN PATENT DOCUMENTS

| | | |
|---|---|---|
| EP | 2517543 A2 | 10/2012 |
| EP | 2743132 A1 | 6/2014 |

OTHER PUBLICATIONS

International Search Report and Written Opinion for Application No. PCT/EP2018/062081 dated Jul. 6, 2018 (11 pages).

*Primary Examiner* — Maria E Vazquez Colon
(74) *Attorney, Agent, or Firm* — Peter Zacharias; Patrick Sheldrake

(57) ABSTRACT

A system that includes an agricultural tractor that includes a steering mechanism for steering at least one surface-engaging member so as to cause changes in a direction of movement of the agricultural tractor; and an agricultural implement that is towed behind the agricultural tractor. The system further includes at least one forward sensor for sensing one or more objects or conditions located forwardly of the agricultural tractor and at least one lateral sensor for sensing one or more objects or conditions that when sensed are located laterally of the agricultural tractor or implement. The system further includes a controller that acts in dependence on at least one output of the at least one lateral sensor to take account of a presence of the one or more objects or conditions sensed by the at least one lateral sensor.

15 Claims, 2 Drawing Sheets

(56) References Cited

U.S. PATENT DOCUMENTS

| | | | |
|---|---|---|---|
| 2007/0175198 A1* | 8/2007 | Viaud | A01F 15/0883 56/341 |
| 2008/0224445 A1* | 9/2008 | Viaud | A01F 15/0833 280/442 |
| 2009/0204281 A1* | 8/2009 | McClure | A01B 69/001 701/25 |
| 2014/0324345 A1* | 10/2014 | Story | G05D 1/0219 701/540 |
| 2018/0189689 A1* | 7/2018 | Story | G06Q 10/047 |
| 2018/0194344 A1* | 7/2018 | Wang | G05D 1/0257 |
| 2018/0316895 A1* | 11/2018 | McClelland | H04N 7/188 |
| 2020/0380257 A1* | 12/2020 | He | G06K 9/325 |

\* cited by examiner

VEHICLE-TRAILER COMBINATIONS

BACKGROUND OF THE INVENTION

The invention concerns improvements in or relating to vehicle-trailer combinations. The invention is of particular utility in situations in which a trailer is towed to make repeated passes along an area such as a farm field.

It is well known in the technical field of agricultural machines, and in other sectors of the transport industry, to tow a wheeled or otherwise ground-engaging (e.g. through skids or tracks) trailer behind a powered vehicle, such that the trailer can perform specific tasks.

In agriculture in the majority of cases the vehicle is a tractor.

An example of a trailer to which the invention particularly pertains is a baler or baling machine. This creates bales of valuable stalk (or other plant constituent) products such as hay, silage vegetation and straw that are deposited in fields as harvesting or mowing operations take place. Such products are referred to herein as "harvest products" and derivatives. In the majority of cases the baler is neither autonomous nor self-powered, and instead is towed behind an agricultural tractor from which it derives rotary power to drive its pickup components and internal machinery.

The hay, straw or similar products requiring baling usually are left in fields in the form of swaths or windrows, i.e. elongate rows of the products in question that are heaped in the transverse centre and tend to flatten at the respective transverse edges. Although according to some definitions there are differences between e.g. swaths and windrows, except where the context requires these terms are used interchangeably herein.

Each swath usually extends in as straight a line as possible for almost the entire length of a field or along lines that are equidistant from the periphery of the field or from contours in the field. Typically a field that has undergone harvesting contains many, essentially mutually parallel, swaths.

The invention is applicable in the use of balers to bale harvest products such as stalks or other plant parts as deposited in swaths or in windrows created by a primary operation such as harvesting or mowing; or a secondary operation such as raking, tedding or hay bobbing.

The invention is however also applicable in the case of towing a different type of trailer than a baler. As an example in this regard one may consider the case of a tractor supporting and thereby drawing an implement such as a plough, harrow or similar tillage device. Another example is the case of a tractor towing an un-powered seeding trailer or crop spraying/field dosing trailer.

The invention also potentially is of use in a great variety of further situations in which a trailer is towed by a vehicle. These may involve both off-road situations as arise in farm fields as outlined and when a vehicle tows a trailer on a roadway or other surfaced area.

As implied above a tractor-baler combination is illustrative of the invention. This is in part because tractor-baler combinations typically make repeated passes along the windrows in a field, as explained further below.

Balers fall in to several categories. The most common types presently in use are those for creating so-called "round" bales, usually of hay or straw (that are approximately cylindrical); and those for creating so-called "rectangular" or "square" bales (that are cuboidal). Each bale type is associated with particular storage and handling characteristics.

Among rectangular balers the most common types produce either "large rectangular bales" or "midi rectangular bales". As the names imply, the former are larger than the latter.

Regardless of the exact type, in use a baler is hitched to the rear of a tractor and the power take-off (PTO) shaft of the tractor connected to provide rotary drive to the baler. The PTO shaft rotates at a speed determined by the settings of the tractor engine and in some cases certain other variable parameters that are settable e.g. by the tractor driver or as a result of automatic or semi-automatic control actions initiated in the tractor or baler such as when one or more sensors produces a particular output, class of output, value or range. Typically the PTO shaft includes a universal joint or similar flexible drive-transferring arrangement, with the result that the connection to the baler does not have to be directly in line with the PTO connection on the tractor, and instead may be offset laterally from it.

The PTO shaft provides rotary drive for the various parts of the baler that move to cause ingestion and baling of stalks. U.S. Pat. No. 4,433,533-A includes an explanation of the operation of a round baler. An example of rectangular baler operation is described in FR-2684517-A.

In use of a tractor-baler combination the tractor tows the baler along each swath in turn, from one end of a field to the other, with the pick-up ingesting the harvest products requiring baling. This causes removal of the harvest products forming the swaths as the bales are formed. At the end of each swath that has been ingested in this way and formed into bales the tractor-baler combination turns in the field headland and passes in the opposite direction along the field to cause baling of the harvest products of the next swath in turn to be baled.

The successively baled swaths nearly always extend parallel to one another along the field. Sometimes the tractor-baler combination will be able to bale each sequentially adjacent swath in turn. In other situations the field conditions such as the headland width and the centre-to-centre spacings of the swaths (determined in turn by e.g. the header width of the harvesting or other machine used during the primary harvesting operation) dictate that the tractor-baler combination must bale e.g. every transversely alternate swath in turn, with the swaths that as a result are initially not baled being baled during later passes of the tractor-baler combination along the field.

In either case a problem associated with the use of a tractor-baler combination is that there may exist any of a number of adverse conditions in one or some of the swaths, but not all of them.

Examples of such adverse conditions include but are not limited to obstacles or artefacts such as electricity or telecommunications poles, pylons, building parts or ruins, cables, pipes, agrochemical sacks, tanks, bowsers and other liquid containers, trees, intruding branches and bushes; completed bales and stacks of bales; terrain features such as hollows in the ground, slopes, mounds and ridges; ground conditions such as moisture, sand, bogginess, stony ground and frozen ground; and harvest product conditions such as high moisture levels. Furthermore agricultural fields increasingly are becoming multi-purpose and may as a result contain non-traditional features such as wind turbines, solar panels and control/transmission equipment for such technology. These features additionally present hazards to vehicle-trailer combinations.

The operation of agricultural machinery in recent years progressively has become automated or at least subject to aspects of automation. Automated systems as have been used hitherto are inefficient at coping with adverse conditions as exemplified above.

Self-evidently in this regard an automated tractor control system that is unaware of physical hazards such as obstacles in its intended trajectory may be involved in an accident that could disable the tractor, damage or destroy the obstacle or have even more severe consequences. There is a need to address this drawback of vehicle control systems.

Even when the conditions in a field do not include obstacles, there remains a need for a towing tractor to cope with changes from one part of a field to another. Thus for example if the moisture content of the harvest products alters, or the gradient of the field changes, from place to place it is desirable that any automated or partly automated control system is able to make adjustments to the settings of the tractor in order to minimise the effect of such changes.

It is known to provide tractors and some other types of towing vehicle with sensors the purpose of which is to sense the path ahead of the vehicle, and provide inputs to an automated or semi-automated control system as described above. Such sensors include optical devices such as charge coupled device cameras (that may be single devices or stereovision systems employing two cameras such as two RGB cameras as will be familiar to the person of skill in the art), radar sensors and acoustic sensors, and they assist a tractor to avoid some types of hazard that lie in its intended route. Sensors that sense the forward path of a vehicle such as a tractor however are of limited benefit in situations as described above.

SUMMARY OF THE INVENTION

According to the invention in a first aspect there is provided a moveable vehicle-trailer combination including (a) a self-powered vehicle having one or more surface-engaging members and a steering mechanism for steering at least one said surface-engaging member so as to cause changes in a direction of movement of the vehicle; (b) a trailer that is towed behind the vehicle as the vehicle moves forwardly and is pivotably connected to the vehicle; (c) one or more forwardly effective sensors for sensing one or more objects and/or artefacts and/or conditions located forwardly of the vehicle; (d) one or more laterally effective sensor for sensing one or more objects and/or artefacts and/or conditions that when sensed are located laterally of the vehicle and/or the trailer; and (e) a control and/or processing apparatus that acts in dependence on at least one output of the one or more laterally effective sensors to take account of the presence of one or more objects and/or artefacts and/or conditions sensed by the one or more laterally effective sensor.

As examples of surface-engaging members one may consider wheels (that may be equipped with tyres, or untyred); tracks; skids and even water vessel features such as hulls, rudders and pods.

An advantage of the invention is that it permits a vehicle-trailer combination that makes repeated passes along e.g. windrows or similarly elongate features to adopt an optimised path relative to a hazard, obstacle or condition before commencing a pass the path of which intersects with the hazard, object or condition. In turn this maximises both the safety and efficiency of operations.

For the avoidance of doubt, the existence or positions of one or more as yet unbaled swaths may be included in the conditions or artefacts sensed by the laterally effective sensor.

Further the for the avoidance of doubt the one or more forwardly effective sensor and the one or more laterally effective sensor may be, or may be operative parts of, one and the same sensor device. In such an embodiment of the invention the sensor device would be effective to sense a three-dimensionally wide field of view such as most or all of a sphere or circle. Point cloud data collation and processing techniques, as would be known to the person of skill, could be employed to analyse the outputs of such a sensor and generate control commands as a result.

Preferably the one or more laterally effective sensor senses a field of view that is at least a two-dimensional polygon located laterally of the vehicle and/or the trailer, the location of the polygon moving as the vehicle-trailer combination moves to define a trajectory field of view approximating to the trajectory of the vehicle-trailer combination.

Also preferably at least one said laterally effective sensor is or includes an optical or point cloud generating camera, although other forms of sensor, as explained herein, are viable within the scope of the invention. Combinations of different sensor types in one and the same vehicle-trailer combination also are possible.

Conveniently the control and/or processing apparatus is connected to operate the steering mechanism of the vehicle such that the vehicle-trailer combination follows a path that takes account of the presence of one or more objects and/or artefacts and/or conditions sensed by the one or more laterally effective sensor. As a consequence the vehicle-trailer combination may be responsible not only for determining an optimal path that takes account of hazards in anticipated passes along e.g. a field but also for causing the vehicle, and hence also the trailer, to follow such an optimised path.

In particular in preferred embodiments of the invention the control and/or processing apparatus operates the steering mechanism to steer the vehicle-trailer combination so as to avoid one or more objects and/or artefacts and/or conditions sensed by the one or more laterally effective sensor. Such avoidance may involve e.g. a temporary detour from an otherwise routine pass, or the complete avoidance of a pass that would otherwise require a detour. The determination of the exact kind of avoidance measure may be determined based on a number of parameters such as but not limited to the size and/or power of the vehicle-trailer combination, any prevailing gradient or other conditions in the vicinity of or defining the hazard, various settings of the vehicle and the scale of the hazard.

In view of the foregoing optionally the control and/or processing apparatus operates the steering mechanism to steer the vehicle-trailer combination so as to optimise the positioning of the vehicle and/or the trailer with respect to one or more objects and/or artefacts and/or conditions sensed by the one or more laterally effective sensor. Thus one advantageous avoidance method may involve e.g. minimising the deviation of the vehicle-trailer combination from a routine pass that is needed to avoid a detected hazard.

In more detail, in preferred embodiments of the invention the one or more laterally effective sensor senses one or more objects and/or artefacts located laterally of the vehicle or the trailer during passage of the vehicle-trailer combination along a first swath, in a field, encountered by the vehicle-trailer combination; and the control and/or processing apparatus causes the vehicle-trailer combination to take account of the presence of one or more objects and/or artefacts sensed by the one or more laterally effective sensor during passage of the vehicle-trailer combination along a subsequently encountered swath in the field.

In other words, the particularly preferred embodiment of the invention is specifically suited for use in an agricultural field containing a plurality of swaths of crop. However as noted herein other embodiments of the invention are viable in a variety of other situations in which a lead vehicle tows a trailer.

In an optional refinement of the invention the control and/or processing apparatus maps the locations of objects and/or artefacts and/or conditions sensed by the one or more laterally effective sensor.

This is of particular benefit in agricultural situations in which one or more hazards are of a permanent nature and hence will be encountered from year to year during field operations. Many kinds of hazards fall in to this category, as will be known to the person of skill in the art. The mapping of hazards permits their presence to be taken account of over long periods, such as from one year to another or both at the start and end of a growing season.

The mapped hazard data may be stored in a transmissible form such that vehicles other than that of the laterally effective sensor that sensed the hazard presence may benefit from the mapping activity.

Conveniently the control and/or processing apparatus maps the location of one or more objects and/or artefacts and/or conditions sensed by the one or more laterally effective sensors that are not sensed by the one or more forwardly effective sensor.

One advantage of this aspect of the invention is that the laterally effective sensor may be operative to map features when the forwardly facing sensor is rendered inoperative. This may occur e.g. as a result of dust, a common hazard in agricultural fields, that blocks the line of sight of the forwardly facing sensor; or adverse weather phenomena such as heavy rain, snow, sleet or fog.

In this regard it may be desirable in some embodiments of the invention for the or each forwardly effective sensor not to sense exactly the same phenomena as the or each laterally effective sensor.

Thus for example if both a forwardly effective and laterally effective optical sensor are provided their outputs could be differently filtered so that they do not sense the same optical wavelength range. Alternatively the respective forwardly effective and laterally effective sensors could operate according to mutually differing physical principles.

More particularly with regard to the mapping of hazard locations preferably the control and/or processing apparatus maps one or more waypoints, approximating to the trajectory of the tractor-baler combination, in the trajectory field of view sensed by the laterally effective sensor when the latter is the form of field of view generated by the laterally effective sensor.

As noted herein preferably the vehicle is an agricultural tractor and the trailer is a towed agricultural vehicle. Also as noted however the vehicle and trailer may take a variety of other forms.

According to a further aspect of the invention there is provided a method of operating a vehicle-trailer combination according to the invention as defined herein including the steps of (a) causing the one or more laterally effective sensor to sense one or more objects and/or artefacts and/or conditions that when sensed are located laterally of the vehicle and/or the trailer; and (b) causing the control and/or processing apparatus to act in dependence on at least one output of the one or more laterally effective sensors to take account of the presence of one or more objects and/or artefacts and/or conditions sensed by the one or more laterally effective sensor.

Such a method optionally may include the step of (c) causing the control and/or processing apparatus to operate the steering mechanism of the vehicle such that the vehicle-trailer combination follows a path that takes account of the presence of one or more objects and/or artefacts and/or conditions sensed by the one or more laterally effective sensor; and/or the step of (d) causing the control and/or processing apparatus to operate the steering mechanism such that the vehicle-trailer combination steers to avoid one or more objects and/or artefacts and/or conditions sensed by the one or more laterally effective sensor. Advantages of such aspects of the method of the invention are analogous to the advantages of the apparatus counterparts, as described and explained herein.

Optionally, when the vehicle is an agricultural tractor and the trailer is a towed agricultural vehicle, a specific form of the method of the invention includes operating the one or more laterally effective sensor to sense one or more objects and/or artefacts located laterally of the vehicle or the trailer during passage of the vehicle-trailer combination along a first swath, in a field, encountered by the vehicle-trailer combination; and (f) causing the control and/or processing apparatus to operate the steering mechanism to steer the vehicle-trailer combination to take account of the presence of one or more objects and/or artefacts, sensed by the one or more laterally effective sensor, during passage of the vehicle-trailer combination along a subsequently encountered swath in the field.

Preferably the method includes causing the control and/or processing apparatus to map the locations of objects and/or artefacts and/or conditions sensed by the one or more laterally effective sensor and/or one or more waypoints.

Advantages of aspects such as the foregoing are analogous to the counterpart apparatus features of the invention on which they are based.

Preferably the method of the invention includes the step of causing the control and/or processing apparatus to estimate one or more of (i) the absolute quantity of un-baled harvest products in a swath; and/or (ii) the absolute quantity of un-baled harvest products in a plurality of swaths; and/or (iii) a specific quantity of un-baled harvest products per unit length of one or more swaths, and calculating one or more parameters therefrom.

Such parameters may include e.g. the number of remaining bales available to be created in a field or part of a field; the estimated time required to finish baling a field or part of a field; and/or the number of bales it is possible to create before expiry of a time period such as the working shift of a tractor driver.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE DRAWINGS

Figure 1:
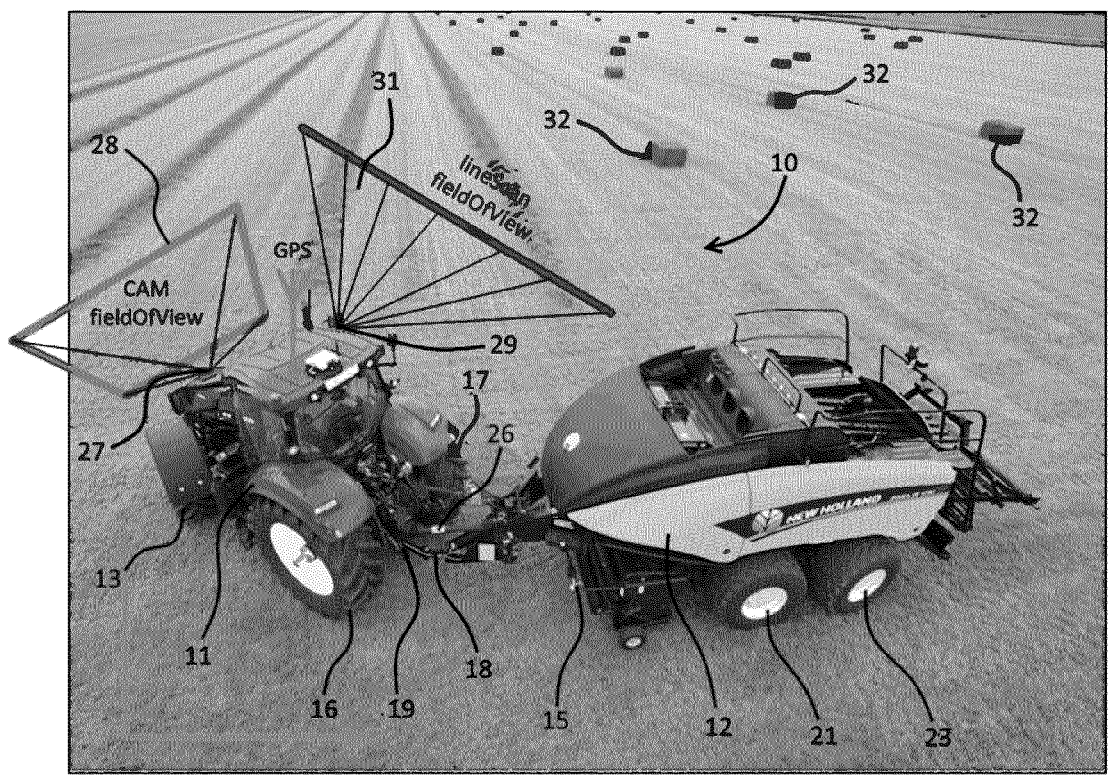
FIG. 1 is a perspective view of a vehicle-trailer combination according to the invention, in the form of a tractor towing a baler in the headland of an agricultural field containing plural swathes of harvest products.

Referring to the drawings, a moveable vehicle-trailer combination 10 according to the invention in a preferred embodiment includes an agricultural tractor 11 that tows a baler 12.

As mentioned the vehicle-trailer combination 10 may take a variety of different forms, but the tractor-baler combination 11, 12 exemplified is illustrative of the principles and practical details of the invention.

Thus the tractor 11 is an example (of many possible vehicle types) of a self-powered vehicle. The tractor 11 is self-powered in the sense that it includes a diesel engine, fuel source in the form of a diesel tank and fuelling system and a drive train including plural drive shafts, a transmission and typically at least one clutch or other drive selection device all of which are familiar to the person of skill in the art.

Tractor 11 includes at least one surface-engaging member, in the form of a plurality of rotatable, tyred, left and right front wheels 13, 14 and left and right rear wheels 16, 17 that support the tractor 11 and permit its movement. As is often the case in the design of agricultural tractors, the rear wheels 16, 17 are of larger diameter than the front wheels 13, 14.

The wheels 13, 14, 16, 17 also are arranged in a manner that is familiar to the person of skill in the art. At least the rear wheels 16, 17 are drivingly connected to the drive train referred to above such that they are driven to rotate about a common, horizontally extending axis when the drive train is engaged and powered. In some tractors the front wheels 13, 14 also are drivingly connected to the drive train in a similar manner. Driving of the wheels in this way causes forward or, if a reverse transmission ratio is selected, reverse movement of the tractor 11 over the ground.

The front wheels 13, 14 are connected to a steering mechanism. This is not illustrated in detail but may be of a design that is familiar in the vehicle art. In such an arrangement the front wheels 13, 14 are mounted on swivelling steering hubs so as to be pivotable about respective left and right vertically extending pivot axes.

A rigid linkage pivotingly connects the steering hubs at locations spaced rearwardly of the vertically extending pivot axes. The linkage is drivingly connected to a steering box or similar drive so as to be moveable laterally relative to the tractor 11. Operation of the steering box causes the linkage to move to the left or the right as desired, with the result that the steering hubs pivot simultaneously about the left and right vertically extending pivot axes.

The tractor 11 includes an operator's cab that includes various controls for controlling operation of the tractor 11. Included among these is a rotatable steering wheel or similar steering input member that is connected to a steering column. The steering column is rotatably mounted in bearings and extends from the cab to the steering box. Rotation of the steering wheel causes operation of the steering box to effect steering of the front wheels as described above.

In many modern tractors the steering mechanism also includes a motor, such as an electric or hydraulic motor, that is capable of activating the steering box (or equivalent device if one is provided) without a need for the vehicle operator to rotate the steering wheel. Such an arrangement operates on the basis of commands generated in a control and/or processing apparatus, such as but not limited to a microprocessor, forming part of or at least operatively connected to the tractor 11.

As a result the tractor may be arranged for automated or semi-automated steering, with the direction of steering of the front wheels 13, 14 being determined based on e.g. programming of a programmable device forming part of the control and/or processing apparatus, the outputs of one or more sensors forming part of the tractor, data such as field map data stored in a memory device, combinations of such influences, or a wide range of other sources of information as would be known to the person of skill in the art. Indeed in some forms of tractor the steering wheel and steering column may be disconnected or dispensed with entirely, and the tractor steered entirely on the basis of the output of the control apparatus. More commonly however the steering wheel and steering column remain in an operative state during automated or semi-automated steering and are simply unused by any operator at such a time.

The tractor 11 also may include a steering mechanism for the rear wheels, although this is comparatively rare. If provided such a mechanism may be similar to the arrangements described above.

As is well known the steering mechanism of the tractor 11 is such that when it is activated while the tractor is moving forwardly under power provided from the engine via the drive train the path of the tractor changes in dependence on the degree to which the steerable wheels are steered.

The baler 12 is towed behind the tractor 11 as the latter moves forwardly over the ground. Towing of the baler 12 is achieved through use of a drawbar 18 that in a typical combination is pivotably secured at its in-use forward end to a towing hitch 19 located at the rear of the tractor 11, between the rear wheels 13, 14. The drawbar 18 in a typical installation as illustrated is rigidly secured to the in-use forward end of the baler 12.

The baler 12 includes at least one surface-engaging member. In the example illustrated in the figures the baler in this regard includes four ground-engaging, rotatable front 21, 22 and rear wheels 23, 24 that support the baler 12 and permit it to be towed over fields and on roads. The wheels 21, 22, 23, 24 are un-powered although as illustrated in FIG. 1 the rear wheels 23, 24 are arranged passively to steer in the event of the baler 12 following a curved or otherwise non-straight path. Various mechanisms are known for achieving this effect that are not directly relevant to the invention and therefore are not described in detail herein.

In alternative forms of the baler 12 e.g. two parallel, non-steerable wheel axles may be provided, or a single axle, depending on factors such as the mass and capacity of the baler 12. Moreover when one of two axles is steerable as indicated it is possible for the front axle (i.e. the front wheels 21, 22) to be steerable instead of the rear axle wheels 23, 24 as illustrated. Yet a further option is for both front and rear axles to be steerable, whereby all four wheels 21, 22, 23, 24 of the baler 12 are capable of changing orientation relative to the remainder of the baler 12.

In general any steering of the wheels of the baler 12 as indicated is "passive" in the sense that the steerable wheels react to changes in direction of the baler in response to changes in the path of the tractor 11 causing the trajectory of the baler 12 to alter. However it is at least theoretically possible for the baler to include one or more powered mechanisms for effecting steering of one or more steerable wheels.

As explained the baler 12 is towed behind the tractor 11. In nearly all cases a baler does not carry its own source of power and instead draws power for its operations from the tractor 11.

Typically this is achieved through use of a rotary power take-off shaft 26 that is connected to the power take-off that normally is present at the rear of the tractor 11 and connects to drive the operative parts of the baler 12. Such parts include a pick-up 15 at the front of the baler and various internal parts that operate to form bales from harvest products defining the swaths as described above. The basic operation of a baler is described e.g. in the prior art documents mentioned above and is not repeated herein.

The tractor-baler combination amounts to a two-part vehicle train in which the baler 12 follows the tractor 11. Changes in direction of the tractor 11 are replicated by the baler 12, although for various kinematics-based reasons the baler 12 does not follow the path of the tractor 11 exactly.

The tractor 11 includes, as is typical in modern tractors, a forwardly facing sensor device such as a camera 27. If embodied as camera 27 the sensor may be e.g. a charge-coupled device or may take a range of other forms. It is also possible for the sensor to operate on the basis of other physical principles such as sonar or other acoustic effects, radar or a range of other phenomena such as but not limited to the Doppler effect.

Another form of sensor that is viable within the scope of the invention is a stereo-optical camera system. In such an arrangement two "RGB" (colour-imaging) cameras are positioned in a horizontally mutually spaced arrangement. Processing software associated with control and/or processing apparatus 41 forming part of the apparatus of the invention may interpret the outputs of such cameras in order to generate a three-dimensional image, or a two-dimensional rendition of such an image.

Camera 27 defines a forwardly facing field of view 28 as signified schematically in the drawings. The output of the cameral is fed to control and/or processing apparatus 41 forming part of or at least operatively connected to the tractor 11 for the purpose of analysing artefacts that lie in front of the tractor 11.

The control and/or processing apparatus 41 may be programmable but this need not necessarily be so. A primary purpose of the control and/or processing apparatus in the context of the camera 27 is to assess features of the path in front of the tractor 11 as it moves forwardly in a field.

If the tractor 11 includes automated or semi-automated steering functionality as described above the control and/or processing apparatus may use signals (that typically are electrical or radio signals, or may take a variety of other forms as would occur to the person of skill in the art) derived from operation of the camera to influence the steering of the tractor 11, and hence the tractor-baler combination 11, 12.

Such signals may be used to generate commands for the motor, referred to above, that is connected to the steering box. As a result a tractor 11 may be caused e.g. to follow in an efficient manner the direction of a swath along a field.

In this regard swaths do not necessarily, or even very often, follow straight lines. This can be because line of the swath during creation was influenced by features of the field and variations in the direction of the harvester that gave rise to the swath. Also the swaths typically exhibit variability along their lengths. Thus the part of the swath exhibiting the highest density of harvest products may not always be at the lateral centre of the swath. It is desirable for the tractor to be able to adjust the lateral position of the baler 12 relative to the swath in order to maximise the amount of plant matter or other harvest products ingested via a laterally central part of the baler pick-up.

A forwardly facing sensor such as camera 28 in effect only takes account of features, variations and artefacts, as described herein, in the path in front of the tractor.

Such an arrangement therefore can only deal with such features, variations and artefacts as are detectable in a path that the tractor is in the process of following. This in turn means that the efficiency of path selection may be sub-optimal if for example the sensor does not detect some obstacle to smooth progress until the tractor 11 is already following a path that would involve intersecting the obstacle.

In such a situation the control and/or processing apparatus may seek to respond to the obstacle, on detection, by causing the tractor 11 to swerve to avoid the obstacle. This could result in an interruption in the ingestion of harvest products into the baler 12, with concomitant adverse effects on bale density and integrity. Also any avoiding manoeuvre on the part of the tractor 11 may cause the wheels of the tractor 11 and/or the baler 12 to run over a swath. This changes the density of harvest products and may make it harder for the baler 12 to pick up the harvest products during a subsequent pass.

In an extreme case the forwardly facing sensor may detect an obstacle too late for the tractor to take effective avoiding action. As a result the tractor 11 or the baler 12 may make contact with the obstacle. Clearly this would be a strongly undesirable situation.

An aim of the invention is to obviate adverse situations such as those described above. To this end the tractor 11 and/or the baler 12 (or other trailer, if the trailer is not a baler) may include one or more laterally effective sensor for sensing one or more objects and/or artefacts and/or conditions that when sensed are located laterally of the vehicle and/or the trailer. The control and/or processing apparatus then may act in dependence on at least one output of the one or more laterally effective sensors to take account of the presence of one or more objects and/or artefacts and/or conditions sensed by the one or more laterally effective sensor, and thereby avoid the drawbacks indicated above.

In more detail, in preferred embodiments of the invention as illustrated the one or more laterally effective sensor may be, or may include, a sideways facing device such as laterally facing camera 29.

As in the case of the forwardly effective sensor the cameral 29 may be a charge-coupled device or another optical sensor; or it may operate on the basis of a different physical principle such as but not limited to radar, acoustic sensing or Doppler sensing as described above.

As best illustrated in FIG. 1 a single laterally effective sensor such as camera 29 produces a field of view 31 that may be a two-dimensional polygon such as the illustrated triangle, or another regular or irregular shape or three-dimensional space extending to one side of the tractor 11. Such a field of view 31 may allow the camera 29 to sense, in advance of passage of the tractor 11 along the path containing them, hazards and obstacles of the kinds described above.

Figure 2:
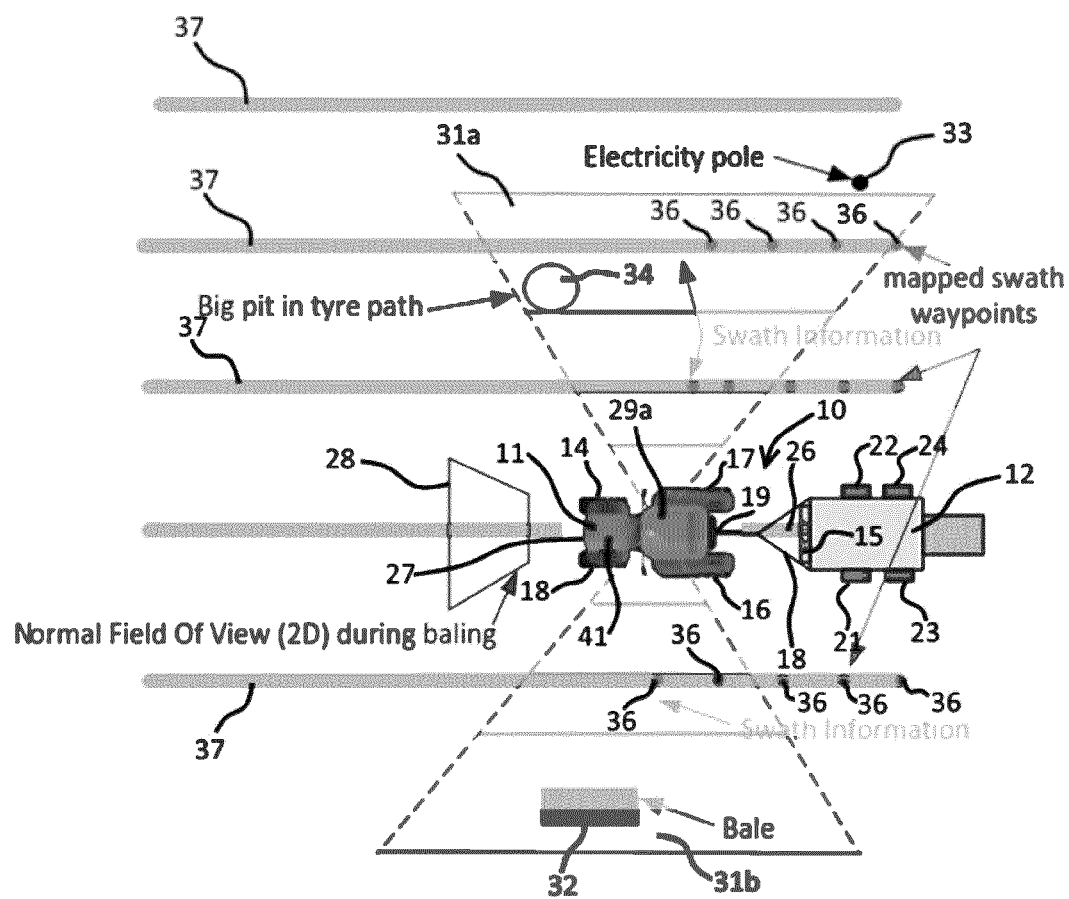
FIG. 2 is a schematic plan view of the FIG. 1 embodiment, during a pass along one of the swaths of FIG. 1.

Examples of such features are visible in FIGS. 1 and 2, and include but are not limited to laterally located bales 32, pylons or poles 33 for cables or telecommunications equipment, ground features such as recesses or pits 34 that might be troublesome for the tyres of the tractor 11 or baler 12 to negotiate, or any of the other types of hazard described herein. The existence of the laterally effective sensor means that the processing device may calculate a route, for the tractor-baler combination 11, 12, that takes account of such hazards in advance of the tractor 11 commencing a pass that would otherwise intersect the hazard(s) in question. The processing device may then effect steering commands that activate the motor of the steering box such that the tractor 11 follows a path taking account of the detected hazards, etc.

This in turn may lead to significant improvements in the efficiency with which the tractor-baler combination 11, 12 moves in a field. As a non-limiting example in this regard the control and/or processing apparatus may be programmed to avoid commencing a pass that intersects a hazard until all possible non-hazardous passes in the field have been completed. The passes involving intersecting hazards may then be dealt with at the end of baling operations in the field, and it may be accepted that the bales resulting from such hazard-intersecting passes are sub-optimal and hence require special treatment. Other control philosophies of course are possible and may be programmed in to the control and/or processing apparatus, assuming this is programmable as is likely to be the case.

Other methods of optimisation and avoidance with respect to hazards detected by the laterally effective sensor(s) may additionally or alternatively be adopted. Typically however, regardless of the exact philosophy adopted for taking account of detected hazards, the apparatus of the invention operates to modify a subsequent pass of the tractor-trailer combination 11, 12 along a field based on outputs of the one or more laterally effective sensor generated during a previous pass along the field.

The apparatus of the invention may be highly effective if it includes a single laterally effective sensor as described; but greater utility of the invention may be available if laterally effective sensing is possible on both sides of the tractor-baler combination 11, 12.

This is illustrated schematically in FIG. 2, in which a laterally effective sensor 29a generates triangular fields of view respectively on the left and right hand sides of the tractor 11.

Such an arrangement may be effected using a single laterally effective sensor that generates respective left and right fields of view 31a, 31b as illustrated; or there may be provided plural sensors, facing respectively to the left and right of the tractor 11, for this purpose.

The fields of view need not adopt the two-dimensional triangular (or other polygonal) shape shown, and instead may have any of a range of shapes and forms (including three-dimensional forms as mentioned). It also is not essential that when two fields of view re generated on opposite sides of the tractor 11 they are of the same shape, although in practical embodiments of the invention this is likely to be the case.

Regardless of the field of view shape adopted however it should be realised that the field(s) of view 31 will move as the tractor moves in the field, and therefore the lateral field(s) of view 31 will follow paths that approximate to the paths followed by the tractor 11.

The laterally effective sensor preferably is embodied as a camera 29, 29a (or a plurality of cameras, as explained) mounted on the tractor 11. This is because it is desirable for the field of view of such sensors to be generated from a location approximately coinciding with the position of an operator's cab of the tractor 11. However in other embodiments of the invention the one or more laterally effective sensor may be mounted on the baler 12, or elsewhere on the tractor 11.

In addition to its functions in effecting steering control of the tractor 11, and hence the tractor-baler combination 11, 12, the control and/or processing apparatus may map locations, objects, artefacts and conditions sensed by the one or more laterally effective sensor. The example of FIG. 2 shows the mapping of locations in the form of waypoints 36 that are spaced at equal, or approximately equal, intervals along the swaths that are yet to be baled by the baler 12. Such waypoints therefore may in one interpretation be regarded as points in the path traced by the lateral field(s) of view 31, and hence as approximations to the path of the tractor-baler combination 11, 12; although they may equally be interpreted and used in other ways, including for example to provide co-ordinates that may be employed to fix the locations of other features in a field; and/or to assist in the assessment of the workload and duty of the tractor-baler combination.

The mapping of locations, objects, artefacts and conditions also or alternatively may include recording data on the lines 37 defined by the swaths before baling. Such data may be useful e.g. when positioning the tractor-baler combination 11, 12 at the start of a pass along a swath, and also as the combination 11, 12 makes such a pass.

As noted herein, the mapping functionality of the apparatus of the invention may be used in a variety of additional ways; and may be employed to compensate for reduced effectiveness of the forwardly effective sensor as explained herein.

More generally the mapping of data enables the construction of detailed field maps during the baling process. These may exist as data values in a database or similar information storage means and/or as visible maps in which data values are converted to features that may be displayed, printed and interpreted by humans and/or by machines. The mapped data moreover may be transmitted by any of a wide range of techniques that will be known to the person of skill in the image mapping art.

As implied by the foregoing the invention extends to both the apparatuses described and exemplified herein; and to methods of using such apparatuses, as explained and defined hereinabove.

Overall the apparatuses and methods of the invention give rise to significant improvements in the arrangement and operation of tractor-baler combinations. As noted however the method also may be employed in respect of other vehicle-trailer combinations as mentioned. Such combinations typically would be ground-supported but (also as mentioned) this need not necessarily be the case.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A system comprising:
   an agricultural tractor comprising a steering mechanism for causing changes in a direction of movement of the agricultural tractor;
   an agricultural implement that is towed behind the agricultural tractor as the agricultural tractor moves forwardly and is pivotably connected to the tractor;
   at least one forward sensor for sensing one or more objects or conditions located forwardly of the agricultural tractor;
   at least one lateral sensor for sensing one or more objects or conditions in a subsequent path and harvest products in a swath along the subsequent path that when sensed are located laterally of the agricultural tractor or the agricultural implement as the agricultural tractor and the agricultural implement travel a first path, the first path and the subsequent path being adjacent each other; and
   a controller connected to the steering mechanism, the at least one forward sensor, and the at least one lateral sensor, the controller being configured to:
   receive at least one first output from the at least one forward sensor;

receive at least one second output from the at least one lateral sensor;

determine an optimized path of the subsequent path before commencing travel on the subsequent path, the optimized path taking account of a presence of the one or more objects or conditions and the harvest products in the swath along the subsequent path which are sensed by the at least one lateral sensor; and control the steering mechanism to cause a change in the direction of movement of the agricultural tractor based on the at least one first output and the at least one second output.

2. The system according to claim 1, wherein the at least one lateral sensor senses a field of view that is at least a two-dimensional polygon located laterally of the agricultural tractor or the agricultural implement, the location of the polygon moving as the agricultural tractor and the agricultural implement move to define a trajectory field of view approximating to a trajectory of the agricultural tractor and the agricultural implement.

3. The system according to claim 1, wherein the at least one lateral sensor comprises an optical or point cloud generating camera.

4. The system according to claim 1, wherein the controller operates the steering mechanism to steer the agricultural tractor so as to avoid the one or more objects or conditions sensed by the at least one lateral sensor.

5. The system according to claim 4, wherein the controller operates the steering mechanism to steer the agricultural tractor so as to change a positioning of the agricultural tractor or the agricultural implement with respect to the one or more objects or conditions sensed by the at least one lateral sensor.

6. The system according to claim 1, wherein the at least one lateral sensor senses the one or more objects or conditions located laterally of the agricultural tractor or the agricultural implement during passage of the agricultural tractor and the agricultural implement along a first swath along the first path, in a field, encountered by the agricultural tractor and the agricultural implement; and wherein the controller causes the agricultural tractor and the agricultural implement to take account of a presence of the one or more objects or conditions sensed by the at least one lateral sensor during passage of the agricultural tractor and the agricultural implement along a subsequently encountered swath in the field.

7. The system according to claim 1, wherein the controller is further configured to map locations of the one or more objects or conditions sensed by the at least one lateral sensor.

8. The system according to claim 7, wherein the controller is configured to map the locations of the one or more objects or conditions sensed by the at least one lateral sensor that are not sensed by the at least one forward sensor.

9. The system according to claim 2, wherein the controller is further configured to map one or more waypoints, approximating to the trajectory of the agricultural tractor and the agricultural implement, in the trajectory field of view sensed by the at least one lateral sensor.

10. A method of operating a system according to claim 1, the method including steps of:

causing the at least one lateral sensor to sense the one or more objects or conditions that when sensed are located laterally of the agricultural tractor or the agricultural implement; and causing the controller to act in dependence on at least one of the first output and the second output to take account of the one or more objects or conditions sensed by the at least one lateral sensor.

11. The method of claim 10, further including a step of causing the controller to operate the steering mechanism of the agricultural tractor such that the agricultural tractor and the agricultural implement follow the optimized path that takes account of the presence of the one or more objects or conditions sensed by the at least one lateral sensor.

12. The method of claim 11, further including a step of causing the controller to operate the steering mechanism such that the agricultural tractor steers to avoid the one or more objects or conditions sensed by the at least one lateral sensor.

13. The method of claim 10, further including steps of:

operating the at least one lateral sensor to sense the one or more objects or conditions located laterally of the agricultural tractor and the agricultural implement during passage of the agricultural tractor and the agricultural implement along a first swath along the first path, in a field, encountered by the agricultural tractor and the agricultural implement; and causing the controller to operate the steering mechanism to steer the agricultural tractor and the agricultural implement to take account of a presence of the one or more objects or conditions, sensed by the at least one lateral sensor, during passage of the agricultural tractor and the agricultural implement along a subsequently encountered swath in the field.

14. The method of claim 10, further including a step of causing the controller to map locations of the objects or conditions sensed by the at least one lateral sensor or one or more waypoints.

15. The method of claim 10 further including steps of:

causing the controller to estimate one or more of (i) an absolute quantity of un-baled harvest products in the swath; and/or (ii) an absolute quantity of un-baled harvest products in a plurality of swaths; and (iii) a specific quantity of un-baled harvest products per unit length of one or more swaths, and calculating one or more parameters therefrom.

* * * * *